Nov. 19, 1957     L. E. KLEIN     2,813,615
FEEDING MEANS FOR OBJECTS OF UNIFORM SIZE AND WEIGHT
Filed March 24, 1954     2 Sheets-Sheet 1
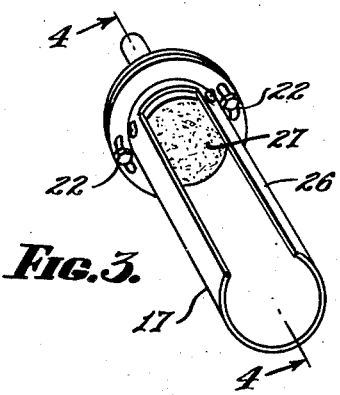
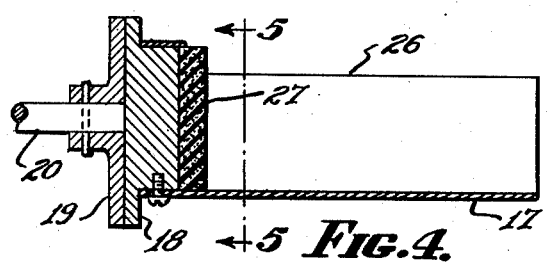
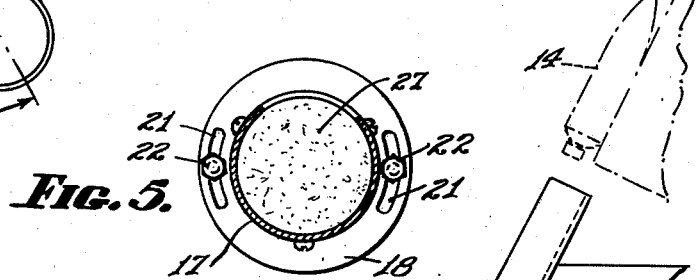
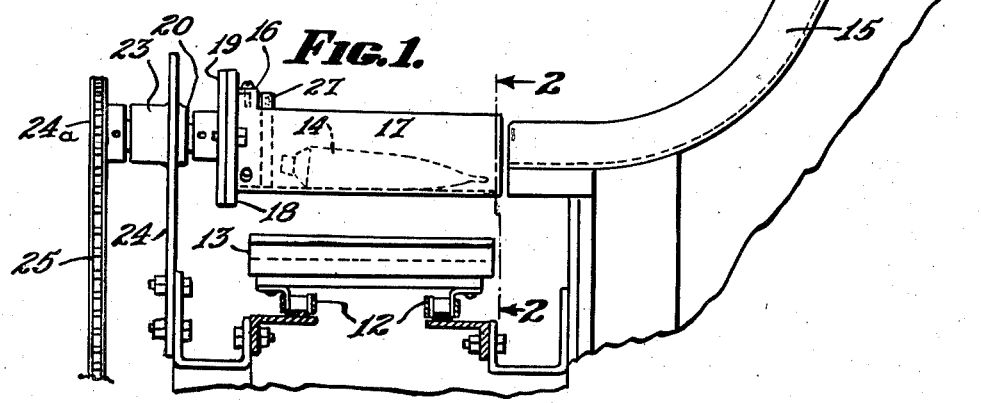
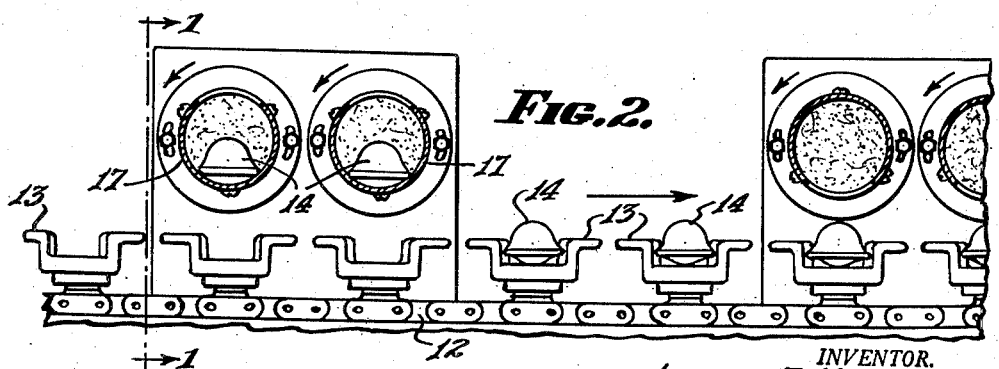
INVENTOR.
LORENZ E. KLEIN,
BY Allen & Allen
ATTORNEYS.

Nov. 19, 1957  L. E. KLEIN  2,813,615
FEEDING MEANS FOR OBJECTS OF UNIFORM SIZE AND WEIGHT
Filed March 24, 1954  2 Sheets-Sheet 2
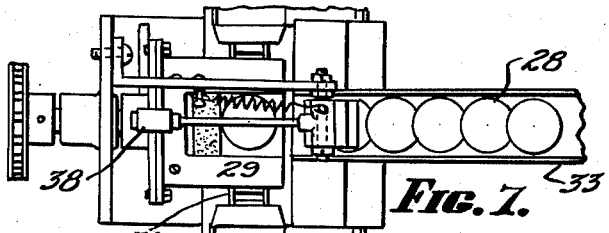
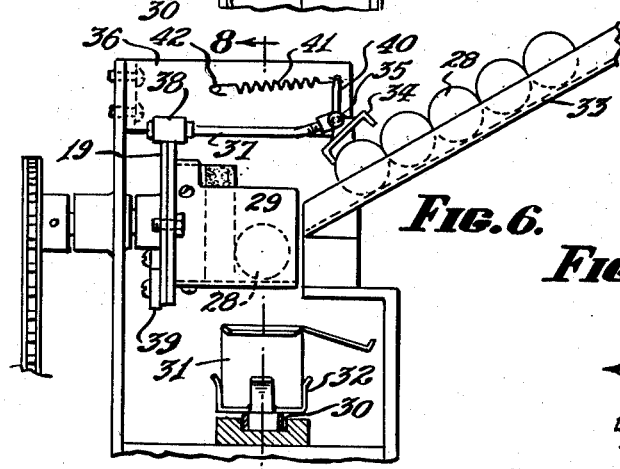
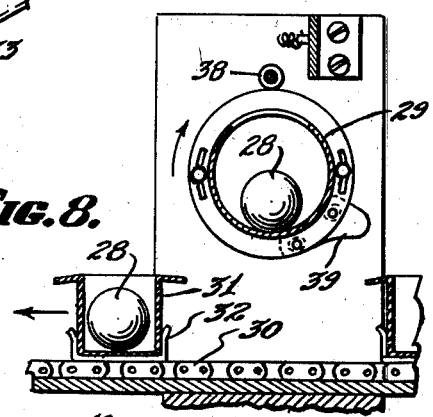
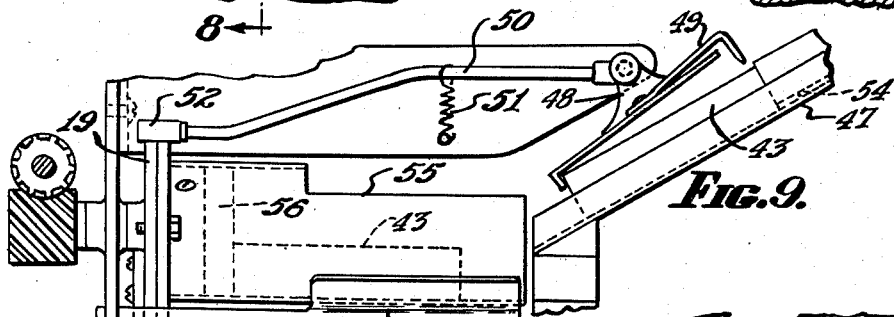
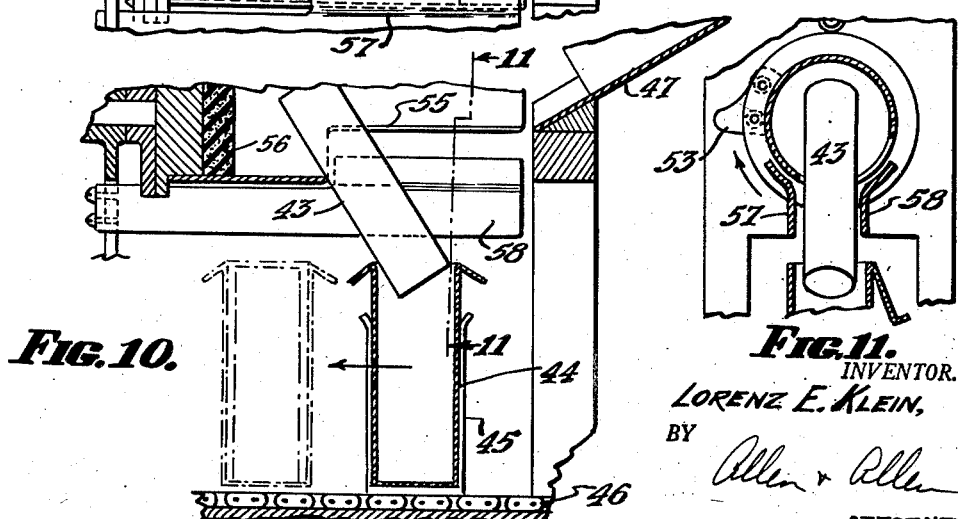
INVENTOR.
LORENZ E. KLEIN,
BY
Allen & Allen
ATTORNEYS.

United States Patent Office 2,813,615
Patented Nov. 19, 1957

2,813,615

FEEDING MEANS FOR OBJECTS OF UNIFORM SIZE AND WEIGHT

Lorenz E. Klein, Cincinnati, Ohio, assignor to The Procter & Gamble Company, Cincinnati, Ohio, a corporation of Ohio Application March 24, 1954, Serial No. 418,439

3 Claims. (Cl. 198—25)

The invention relates to means for controlling the movement of a succession of uniform objects, and in particular to a mechanism for receiving such objects and accurately positioning them on a conveyer, or introducing them into a succession of moving containers all at high speed.

It is an object of the invention to provide a mechanism capable of receiving similar objects in succession which are not accurately timed as to their movements, and of delivering the object to a moving means in precisely timed order.

It is an object of the invention to provide a mechanism acting to receive a series of objects in succession and deposit them in accurately spaced and positioned order on or with respect to a traveling means.

More specifically, one of the objects of the invention is the provision of a mechanism which acting in conjunction with a conveyer having pockets or receptacles, will receive a succession of uniform objects and deposit them accurately in the said pockets or receptacles.

It is another object of the invention to provide a mechanism which will receive articles moving in one direction, arrest their movement and then cause them to move in accurately timed relationship in the same or another direction.

It is an object of the invention to provide a mechanism of the character referred to which is capable of operating at high speeds.

These and other objects of the invention which will be set forth hereinafter or will be apparent to one skilled in the art upon reading these specifications, are accomplished by that construction and arrangement of parts, and in that mode of operation, of which certain exemplary embodiments will now be described. Reference is made to the accompanying drawings wherein:

Figure 1 is a transverse vertical section through apparatus illustrative of the invention, related to the section line 1—1 of Figure 2.

Figure 2 is an elevational view, with parts in section, of a conveyer and depositing means associated therewith, related to the section line 2—2 of Figure 1.

Figure 3 is a perspective view of one of the depositing elements.

Figure 4 is a longitudinal sectional view thereof taken along the line 4—4 of Figure 3.

Figure 5 is a transverse sectional view thereof taken along the line 5—5 of Figure 4.

Figure 6 is a transverse vertical sectional view of a modified form of apparatus for handling elements such as balls.

Figure 7 is a partial plan view of the same mechanism.

Figure 8 is a partial longitudinal sectional view taken along the line 8—8 of Figure 6.

Figure 9 is a partial vertical transverse sectional view of a modified apparatus.

Figure 10 is a partial longitudinal sectional view thereof related to the section line 10—10 of Figure 9.

Figure 11 is a partial transverse sectional view related to the line 11—11 of Figure 10.

The embodiment of the invention illustrated in Figures 1 to 5 inclusive is one designed to receive collapsible tubes in filled and closed condition from tube filling machines, and to deposit these tubes in accurately located position in pockets or receptacles on a continuous conveyer. The conveyer carries the tubes to a cartoning station where the tubes are automatically thrust into erected paperboard cartons which are then closed. Additional apparatus is employed to load the filled cartons into shipping containers. The tube filling machines and the cartoning and other packing apparatus mentioned are not herein illustrated since they do not constitute a limitation upon the invention.

In a particular commercial embodiment the pocketed conveyer is fed with tubes from two tube filling and closing machines. A pair of chutes lead from each such machine to devices adjacent the conveyer, which devices receive the tubes and deliver them to the conveyer pockets aforesaid. The apparatus operates in such a way that a tube is delivered to each pocket on the conveyer, there being four delivery devices in the particular embodiment, arranged in two pairs. The order in which the tubes are delivered to the conveyer pockets can be varied. For example, one pair of depositing devices can be arranged to deposit tubes in a pair of adjacent pockets on the conveyer while the other pair of depositing devices can be arranged to deposit tubes in a next succeeding pair of adjacent pockets. Or one pair of depositing devices can load tubes into a first and fourth pocket while the other pair operates to load tubes into a second and third pocket in the group.

The conveyer is indicated in Figures 1 and 2 at 12 and the tube receiving pocket members thereon at 13.

In Figure 1 a filled and closed collapsible tube 14 coming from a filling machine is shown about to enter a chute 15 by means of which it will be gravitationally delivered to a depositing device. The depositing device, indicated generally at 16 comprises a hollow cylindrical member 17 which is mounted horizontally for rotation. In the exemplary construction the cylindrical member is fastened, by screws or other means, to the hub of a flange member 18. This lies against another flange member 19 which is affixed to a shaft 20. The flange is slotted as at 21, bolts 22 being passed through the slots so that the flange 18 may be affixed to the flange 19 in rotationally adjusted positions.

The shaft 20 is journaled in a boss 23 on a bracket 24 fastened to the machine frame; and the outer end of the shaft 20 is provided with a sprocket 24a which may be connected by a chain 25 to the drive (not shown) for the conveyer 12. Other means for rotating the shaft 20 may be substituted, it being necessary only to drive the shaft in timed relationship with the movements of the conveyer.

The cylindrical element 17 has a portion cut away longitudinally as at 26. The cut away portion or slot will normally not occupy more than about 30% of the circumference of the cylinder. The cylinder has, as shown, a diameter substantially larger than any transverse dimension of the article to be deposited, as for example the collapsible tube 14; and the width of the slot 26 will be sufficient to permit the article to pass therethrough.

The object to be deposited is, of course, introduced into the depositing means 17 through the open end thereof, and leaves the depositing means or cylinder 17 through the slot 26 when the depositing device has attained a specific rotary position. What this position is will depend on various factors such as the size and weight of the object and the coefficient of friction between the surface of the object and the inside surface of the cylinder 17. For example, a filled toothpaste tube having a certain size and weight will be released from the cylinder 17 by gravity at a particular rotary position of the cylinder. An object of precisely similar dimensions but made, say, of sponge rubber so that its weight and the coefficient of friction would be different, would fall out of the cylinder 17 at a somewhat later stage in the cycle of rotation. But all objects of the same size, weight and coefficient of friction will be deposited or released at the same rotary position of the cylinder so that by correctly timing the rotation of the cylinder with the movement of the conveyer 12 it becomes possible to deposit an article accurately in a pocket 13 on the conveyer.

On the other hand, because the slot will normally occupy 30% or less of the periphery of the cylinder the feeding of the objects to the cylinder does not require very exact timing. So long as the objects arrive when the cylinder is in a position to retain them they will be accurately deposited in the pockets on the conveyer.

The speed of rotation of the cylindrical depositing means is not a necessary limitation on the invention so long as synchronism is maintained with the movements of the pockets or receiving means on the conveyer. Assuming a given conveyer speed and a succession of closely spaced receiving pockets thereon, a cylindrical depositing means could be so operated as to deposit an object in each pocket on the conveyer, in which event it is evident that the depositing means would have to rotate through 360° during the length of time required for the conveyer to remove one pocket from the receiving position and bring the next pocket into line. The articles would have to be delivered to the depositing means, one for each cycle of rotation. Where, however, a series of depositing means is employed as in Figure 2, any single depositing means is not required to place articles in adjacent successive pockets. Thus, a particular depositing means may be required to load an article, say, into every fourth pocket of the conveyer. Under these circumstances the speed of rotation of the depositing means can be greatly diminished; and while it is evident that it will still be necessary to deliver an object to the depositing means once during each cycle of its rotation, the greater length of the cycle of rotation allows much more time for such delivery and gives much greater leeway in the specific time of delivery.

Thus it has been found possible with apparatus such as disclosed in Figures 1 to 5 to deliver filled toothpaste tubes as discharged from filling machines to the chutes 15, and without further timing cause the depositing means to load a tube 14 into each of the pockets of the conveyer.

Since the objects are delivered to the cylindrical depositing means through their open ends at some appreciable velocity, and since they must be stopped short therein, it is my practice to provide an internal compressible or resilient shock absorbing bumper 27 at the closed end of the cylinder 17.

The dimensions of the depositing means may be varied in accordance with the nature of the articles to be deposited. In Figures 6, 7 and 8 I have shown a mechanism designed for the packaging of spherical objects such for example as tennis balls or golf balls 28. The depositing device in this instance may be shorter as shown at 29. It is mounted, driven and timed as hereinabove described. The conveyer is indicated at 30; and in this embodiment the purpose may be to deposit the balls in individual containers 31 which move along the conveyer in spaced relationship, being held in retainers 32.

The spherical objects 28 may accumulate in the chute 33 as shown, in which event some means may be desired to permit their introduction one by one or groups of definite size, i. e. 2, 3, 4 into the depositing means. Various devices may be employed for such a purpose. I have shown a simple means comprising an escapement device 34 pivoted as at 35 to a bracket 36 on the machine. The escapement has an operating lever 37 bearing at its other end a cam follower 38. This bears against the flange element 19 of the depositing device. At a suitable position on the flange element I affix a cam element 39 which when it engages the cam follower 38 will lift the lever 37, rocking the escapement means in such fashion as to release one of the objects to the depositing means while retaining the next object in the chute.

The escapement means may also be provided with another lever arm 40 connected by a spring 41 to a fixed abutment 42 on the bracket 36. This arrangement biases the escapement means toward the position shown in Figure 6. After the element 39 has disengaged the cam follower 38 the next ball is permitted by the escapement to advance to a position from which it can be released by the next rocking movement of the escapement.

Figures 9 to 11 inclusive illustrate another modification designed for the depositing of elongated objects 43 into cartons or containers 44 held in cages 45 on the conveyer 46. The articles are delivered down a chute 47 and in the event they tend to accumulate therein, a release mechanism such as hereinabove described may be provided. I have shown an escapement means 48 the trailing arm of which is resilient as at 49. The lever arm 50 is biased as at 51 and carries the cam follower 52. The flange element 19 is provided with the cam member 53, operating as hereinabove described. The objects in this embodiment are conceived as cylindrical, and in this event it may be necessary to provide an offset portion 54 in the chute 47 to permit the escapement means to operate properly, as will be evident from an inspection of Figure 9.

In the particular modification, it will be noted in Figures 9 and 10 that the slot 55 of the depositing device terminates a substantial distance from the bumper 56. The parts are so configured that when the depositing device has rotated to the depositing position the center of gravity of the object 43 will lie within the effective length of the slot. Therefore, the article will be released from the depositing means by gravity, but in doing so it will be tipped or rotated as is made clear in Figures 10 and 11. Although an elongated article 43 lies horizontally above the open ends of the cartons 44 before being deposited, it will be so deposited as to enter the carton end-on, and to come to rest therein in a substantially vertical position.

To assist in the introduction of the articles into the cartons, a funnel like arrangement consisting of spaced parts 57 and 58 may be employed in fixed position as shown in the figures.

Apparatus such as is shown in Figures 9 to 11 is useful not only for the introduction of elongated articles into cartons in which they are to be shipped and stored, but is useful also in the introduction of incidental articles into cartons which are filled or to be filled with other materials. By way of example, the apparatus may be used for introducing a piece of tableware such as a knife, fork or spoon into a carton which is to be filled with a granular product, the piece of tableware serving as a premium. Other objects may be similarly handled and deposited including printed matter, coupons and the like.

Modifications may be made in the invention without departing from the spirit of it. Having thus described the invention in certain exemplary embodiments what I claim as new and desire to secure by Letters Patent is:

1. Mechanism for the purposes described comprising a hollow, tubular member having an open end and a closed end, said hollow member also having a lateral aperture through which an object placed therein can be released therefrom by gravity, moving receiving means mounted below said hollow member, said hollow member being mounted for rotation about its axis, means for rotating said hollow member, means for timing the rotation of said hollow member with the movements of said receiving means, means for delivering objects of similar size and weight into said hollow member through the open end thereof, said hollow member being located with its axis substantially horizontally disposed, said delivery means comprising a chute for said objects, said receiving means being a conveyor having object-receiving pockets thereon and means for adjusting the rotary position of said hollow member while maintaining the synchronization thereof with said receiving means.

2. The structure claimed in claim 1 wherein the aperture in said hollow member is a slot extending from the open end thereof to a position spaced from the closed end, said last mentioned position being such that an elongated article within said hollow member will be released therefrom when said hollow member attains a certain rotative position but will be tipped during release so that the orientation of said article will be changed.

3. In combination a moving conveyer adapted to present a series of regularly spaced upwardly open compartments, and means driven in timed sequence to said conveyer for depositing uniform articles in said compartments, said last mentioned means comprising a series of hollow cylinders mounted for rotation on their axes above said conveyer, said cylinders having apertures therein to permit discharge therefrom of articles of uniform size and weight upon the attainment by each cylinder of a predetermined rotative position, said cylinders each having an open end and an abutment adjacent the opposite end, and means for delivering into said cylinders through the open ends thereof a succession of uniform objects for deposit in the compartment on said conveyer, the rotation of said cylinders being so timed that each cylinder will deposit an article in non-successive compartments.

References Cited in the file of this patent

UNITED STATES PATENTS

| | | |
|---|---|---|
| 858,125 | Waldron | June 25, 1907 |
| 907,790 | Hancock | Dec. 29, 1908 |
| 1,435,263 | Soubier | Nov. 14, 1922 |
| 2,558,633 | Tuttle | June 26, 1951 |

FOREIGN PATENTS

| | | |
|---|---|---|
| 672,422 | Germany | Mar. 2, 1939 |